Aug. 26, 1941.   E. D. COLLINS   2,253,688
BAIT CARRIER
Filed April 6, 1940
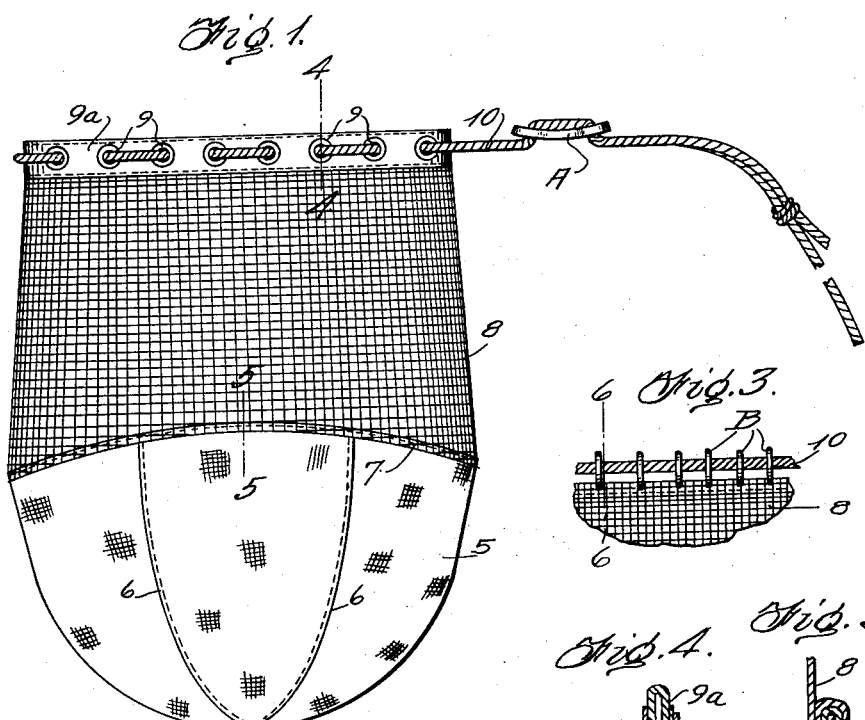
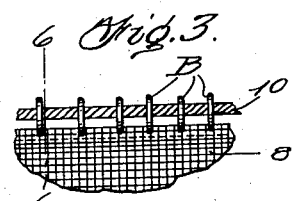
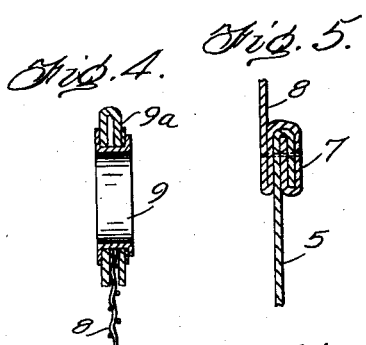
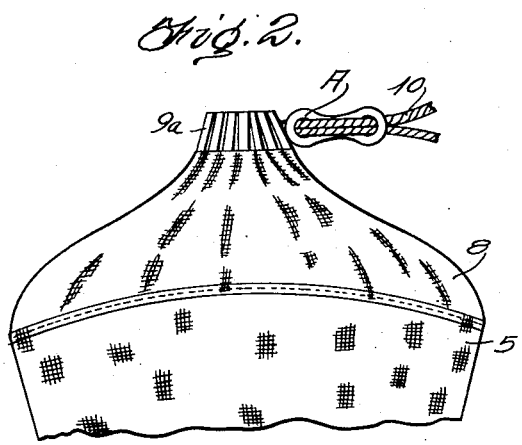
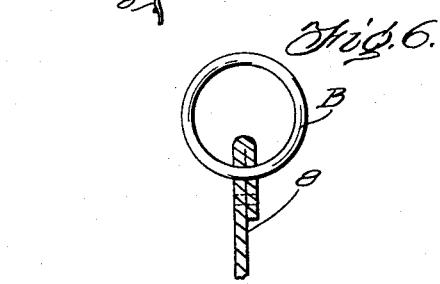
Inventor,
Edwin D. Collins,
By Frank S. Appleman
Attorney Patented Aug. 26, 1941

2,253,688

UNITED STATES PATENT OFFICE 2,253,688

BAIT CARRIER

Edwin D. Collins, Lima, Ohio

Application April 6, 1940, Serial No. 328,283

1 Claim. (Cl. 43—55)

This invention relates to containers or holders for live bait, and an object of the invention is to provide a bait holder or carrier that can be utilized by fishermen when wading or when fishing from a boat or a bank; and a further object of the invention is to provide novel means whereby a quantity of water may be held by the carrier when it is suspended during the removal of bait, a condition which will supply the bait with water and prevent their damage or impairment while the carrier is manipulated for removing the bait.

It is a still further object of this invention to provide a carrier which can be anchored to the apparel of a wader or user in order that the carrier or holder will be suspended from a boat or fisherman as a fisherman proceeds, it being understood that the carrier will be held closed by a pull exerted, due to the resistance of the water encountered by the carrier, or to the weight of water in the carrier.

It is a still further object of this invention to provide a bait carrier having a lower bowl-shaped portion of a material which will hold water, and an open portion preferably of net or mesh material, the latter having a purse mouth which can be opened or drawn closed, according to the requirements of the user.

It has been found that the carrier referred to herein is of utility for containing fish taken while fishing after the carrier is not needed as a bait holder. The character of the body or bowl-shaped bottom, together with the upper netted portion will act to keep the fish cool, owing to the fact that evaporation or condensation of the water in the moist fabric will create an envelope of cool air which will aid in preserving the fish.

It is furthemore an object of this invention to produce a carrier of the character indicated which will be comparatively inexpensive to manufacture and maintain.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a view in elevation of a bait carrier embodying the invention;

Figure 2 illustrates a view in elevation of a fragment of the bait carrier with the mouth of the carrier closed and secured;

Figure 3 illustrates a view in elevation of a fragment of the bait carrier showing a modified construction at the mouth or open end of the carrier;

Figure 4 illustrates an enlarged sectional view on the line 4—4 of Fig. 1;

Figure 5 illustrates an enlarged sectional view showing the seam or joint between the upper and lower portions of the carrier; and Figure 6 illustrates an enlarged sectional view on the line 6—6 of Fig. 3 omitting the draw string or cord.

In the present embodiment of the invention, the carrier comprises a bottom portion 5 which is bowl-shaped when distended. Preferably the bottom is formed by segmental pieces of material having seams 6 by which they are connected, although the inventor does not wish to be limited with respect to the manner of producing the bottom and it can be made of waterproofed fabric or any material adapted for use in this relation.

Preferably the upper edge of the bottom has a seam 7 which forms an anchorage for the upper net portion 8 of the carrier, the said net portion being connected to the upper edge of the bottom portion in any appropriate way, as by having strands of the net portion extending through the seam. The upper end of the net portion is supplied with a plurality of eyelets 9 which are fixed in a heading 9a attached to the upper edge of the netting. A draw string or cord 10 is threaded through the eyelets and portions of the draw string may be connected together to form a loop the size of the opening in the mouth of the bait carrier, and other portions or lengths of the draw string may be extended for anchoring the carrier to the fisherman or to a boat or other object in order that the bait carrier may be suspended in the water for the preservation of the fish. The draw string or cord is extended through apertures of a keeper or retaining member A, preferably flexible, and it has been found in practice that if the member A is made of rubber, it can be flexed so that the apertures therein will aline to facilitate the movement of the cord therethrough, and when the said member is released it will occupy substantially the position shown in Fig. 1, and the frictional engagement of the cord therewith will serve to retain the cord in different positions of adjustment.

In Figure 3 a modified arrangement is illustrated, in which rings B are attached to the upper edge of the net section of the carrier and the draw string or cord is threaded therethrough in the same manner as the cord is associated with the eyelets in Fig. 1, and provision is made in the same manner for retaining the cord or draw string in different positions of adjustment.

From the foregoing description and illustration, it is obvious that if the carrier is fastened to a wading fisherman through the use of the draw string or cord, the action of flowing water in the stream being fished will hold the carrier at the rear of the wader while he is wading upstream or the current will hold the carrier slightly in front of the wader if he is wading downstream, so that it does not interfere with the casting operations of the fisherman. Furthermore, if it is desired to re-bait the hook, the carrier may be raised and opened to permit access to the bait all the while the said bait is in sufficient water in the bottom portion of the carrier to keep it alive. The fisherman may select a bait, holding it in his hand in the open container while the bait is applied to the hook so that liability of the bait escaping is minimized. It is obvious furthermore that when the hook is baited and the carrier released, its weight with the attending water contents will serve to cause the draw string to pull through the eyelets so that the purse-like mouth of the carrier is drawn closed and thereafter the slidable clasp may be manipulated for the purpose of retaining the draw string against its being moved until a repetition of the operation is desired.

As the objects and purposes of the invention have been stated and the manner of operating it in order to perform the intended functions has also been stated, those skilled in the art will, it is thought, understand the invention without further description.

I claim:

A bait carrier comprising a water impervious flexible bag having a substantially semispherical shape and open at its upper edge, a substantially cylindrical flexible mesh net secured to the upper edge at its lower edge, a flexible and collapsible binding on the upper edge of the net having openings therein, a length of strand-like material extending through the openings on alternately inner and outer sides of the binding, a slidable clasp for the strand-like material whereby movement of the clasp along the strand will permit opening and closing of the upper end of the net and the material within the bag will be adapted gravitationally to cause closing of the upper end of the net when the bag is held in suspended relation out of contact with an under supporting surface, said clasp being adapted to retain the mesh net closed.

EDWIN D. COLLINS.